April 28, 1970     A. A. BERUBE     3,509,535

FERROMAGNETIC RECOGNIZER OF DOCUMENTS

Filed June 9, 1966     3 Sheets-Sheet 1

INVENTOR.
ARTHUR A. BERUBE

BY

*Blum, Moscovitz, Friedman, Blum & Kaplan*
ATTORNEYS

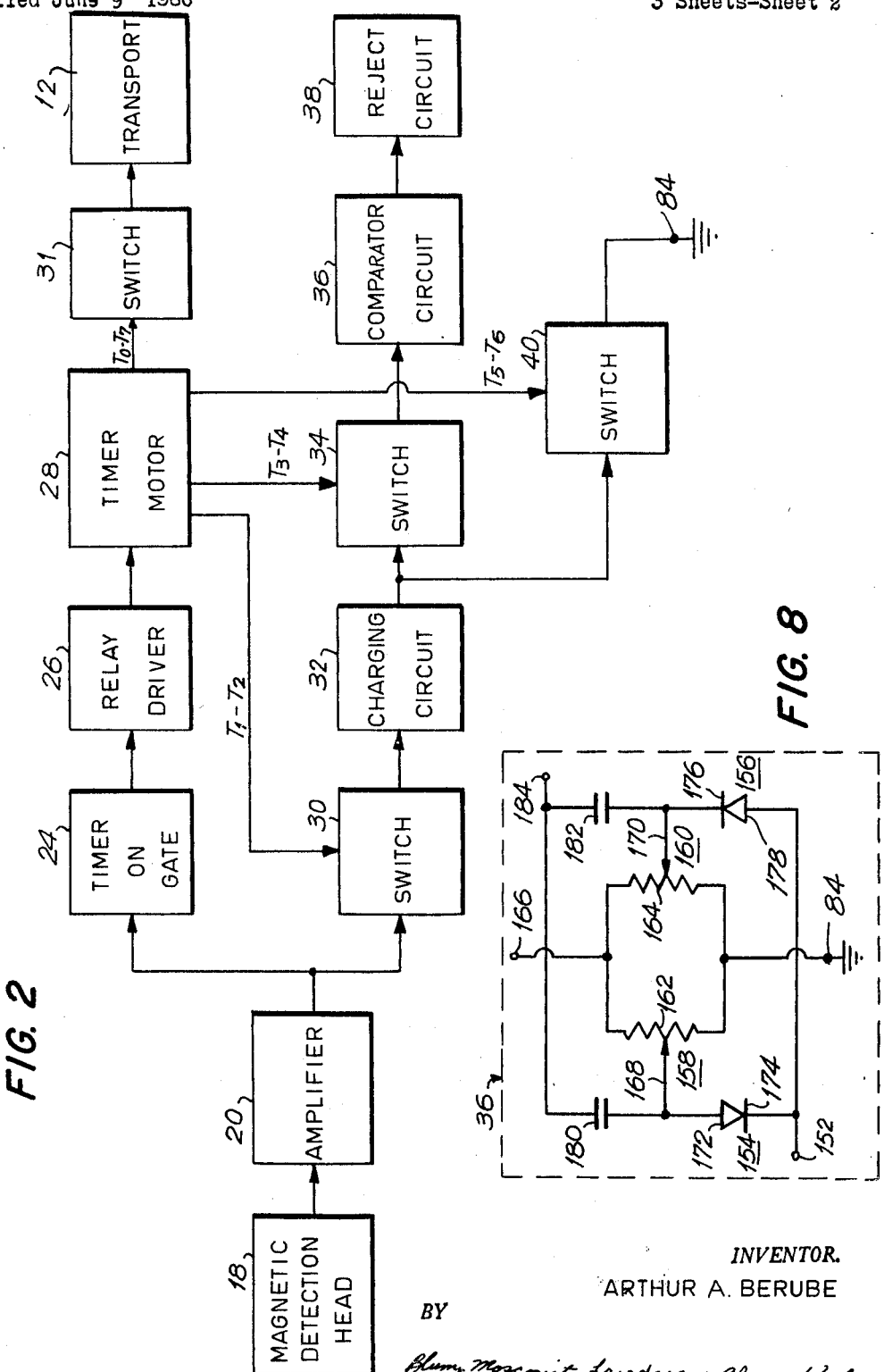

April 28, 1970     A. A. BERUBE     3,509,535

FERROMAGNETIC RECOGNIZER OF DOCUMENTS

Filed June 9, 1966     3 Sheets-Sheet 3

INVENTOR.
ARTHUR A. BERUBE

BY

*Blum, Moscovitz, Friedman, Blum & Kaplan*
ATTORNEYS

United States Patent Office 3,509,535
Patented Apr. 28, 1970

3,509,535
FERROMAGNETIC RECOGNIZER OF
DOCUMENTS
Arthur A. Berube, Nyack, N.Y., assignor to Arcs
Industries, Inc., Bronx, N.Y., a corporation of
New York
Filed June 9, 1966, Ser. No. 556,320
Int. Cl. H04q 3/00
U.S. Cl. 340—149                                          6 Claims

ABSTRACT OF THE DISCLOSURE

A ferromagnetic recognizer wherein a ferromagnetic inked surface is transported past a magnetic source and a ferromagnetic detection means, said ferromagnetic detection means being operative to detect the ferromagnetic content of said inked surface and to provide a series of electrical signals, corresponding to said detected ferromagnetic content. A charging means accumulates said signals after amplification thereof to produce a sum signal, said sum signal being passed through a comparator means for determining whether the magnitude of said sum signal lies within preselected limits to produce a recognition signal.

---

The present invention is related generally to apparatus for recognizing objects and more paricularly to apparatus for identifying the optical characteristics of objects has particular importance in its application to the task of determining the denomination and authenticity of printed documents such as paper currency. The specific system described herein as embodying the principles and novel features of the present invention, although directed to the identification of the denomination and authenticity of paper currency which has one face engraved with magnetic ink, is equally applicable to other types of objects, which have a ferromagnetic inked surface, such as securities certificates. The importance of apparatus capable of identifying the authenticity of paper currency can be readily appreciated in view of the tremendous growth of the automatic vending industry in which the vending machines have been limited in utility since they generally accept only coins and consequently place a serious limitation on the maximum value of products which may be dispensed thereby.

In U.S. paper currency the portrait surface of the bill has a series of closely spaced parallel lines of ferromagnetic ink in the background area surrounding the portrait. Since the ferromagnetic line spacing is very close and precise and hence very difficult to duplicate by unauthorized means, ferromagnetic ink detection is a reliable method of determing the authenticity of paper currency or the like.

It is therefore an object of the present invention to provide reliable apparatus for determining the authenticity of paper currency and similar documents having ferromagnetic inked surfaces.

In accordance with the principles of the present invention there is provided apparatus for recognizing an object having a ferromagnetic inked surface. The recognizing apparatus of the present invention comprises a D.C. magnetic source for magnetizing the ferromagnetic inked surface of the object to be tested, ferromagnetic detection means for detecting the ferromagnetic ink deposition, and transporting means for moving the object past the magnetic source and ferromagnetic detection means.

The ferromagnetic detection means is operative to detect the ferromagnetic content of the inked surface of the object as the object moves therepast, and to generate an electrical signal corresponding to the detected ferromagnetic content in the inked surface.

The generated electrical signal is fed by switching means to comparator means which determines whether the generated electrical signal lies within preselected limits to thereby recognize the object.

The features of the present invention which are believed to be novel are set forth with particularly in the appended claims. The invention, itself, however, both as its organization and method of operation, together with further objects and features thereof may best be understood by reference to the following description taken in conjunction with the accompanying drawings wherein:

FIG. 2 is a block diagram of the preferred embodiment of the present invention

FIG. 8 is a detailed schematic circuit drawing of the Corparator Circuit depicted in FIG 2.

Figure 1:
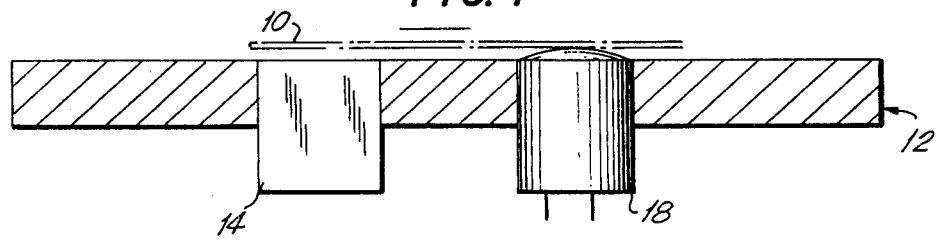
FIG. 1 shows the arrangement, in the preferred embodiment of the present invention, of the object to be tested, the D.C. magnetic source and the magnetic detection head.

Referring to FIGS. 1 and 2, a currency bill 10 or similar document having a ferromagnetic inked surface, is suitably positioned on a transport table 12 whereby a document 10 under test is mechanically transported in the direction shown past a D.C. magnetic source 14. The document 10 has one surface thereof engraved with a ferromagnetic ink and may accordingly comprise U.S. paper currency as well as many other types of documents such as securities certificates. Although, FIG. 3 and the following description refers to the document as comprising a one dollar bill, it is clear that this invention contemplates the use of any of the above mentioned documents to which the following description would equally apply.

Figure 3:
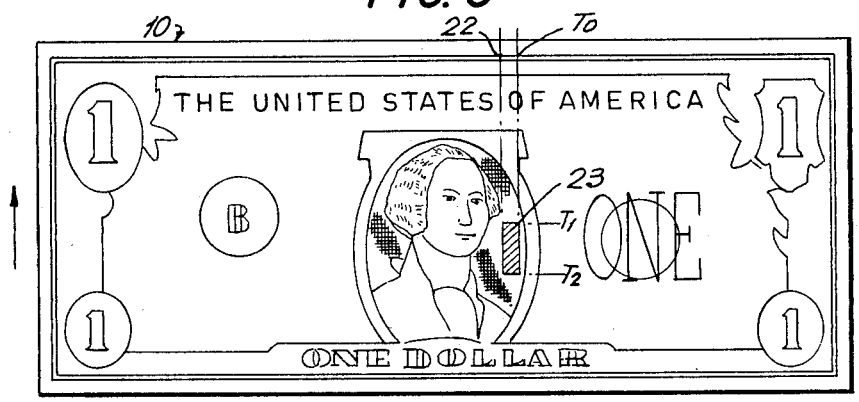
FIG. 3 depicts a typical object to be tested by the preferred embodiment of the present invention.

Referring to bill 10 in FIG. 3, since the portrait background area to be examined has a series of closely spaced thin parallel inked lines, each of these lines when disposed in the D.C. magnetic field produced by magnetic source 14, become suitably magnetized. Bill 10, thus magnetized, is then further transported past a magnetic detection head 18, which counts the magnetic lines in the portrait background area of the bill, with each magnetized line therein producing a spiked electrical pulse as it passes by detection head 18. The pulses thus produced are stored and counted as hereinafter described, with the sum signal thereof representing the total number of magnetized lines in the preselected area. The detected sum signal is then compared with reference signal, which represents the number of magnetic lines in the preselected area in a genuine bill of a given denomination. If the sum signal lies within preselected limits of the reference signal, a recognition signal is produced thereby indicating that the examined bill is authentic. If however, the detected sum signal lies outside of the preselected range, a reject signal is produced indicating that the submitted bill is unacceptable.

Although the above technique of mass counting of ferromagnetic lines is specifically described herein it is understood that with the apparatus of the present invention with slight modifications is capable of performing the detection of the ferromagnetic characteristics of a preselected portion of a bill by a frequency detection method. In the frequency detection method, the ferromagnetic lines on the bill may be detected by traversing the magnetic detection head over thee ferromagnetic lines at a substantially constant speed. The frequency of the signal pulses thereby generated, may then be compared with a reference frequency, which represents the proper ferromagnetic line concentration, to generate an accept or reject signal in a manner similar to that described above, with respect to the magnetic line counting method.

Referring to FIG. 2, magnetic detection head 18 is operative to provide an electrical signal pulse for each ferromagnetic line that moves past its detection head. The signal thus produced comprises a series of spike pulses, each pulse, representing one detected ferromagnetic line being fed to amplifier 20 which suitably amplifies the detected pulse train signal.

The sampling area for ferromagnetic line content may be chosen at various locations on the bill which have a ferromagnetic inked surface. In FIG. 3 a typical sampling area 22 is selected in the portrait area, an area of high magnetic line concentration and this being an area where unauthorized duplication of the lined pattern is considered difficult. As the bill is transported past magnetic detection head 18 in the direction indicated in FIG. 3, the first area of ferromagnetic content to be encountered will be at the top border 22 of the bill. The signal pulse produced by magnetic head 18, when it passes border 22 is suitably amplified by amplifier 20 and fed to gate circuit 24 which, in response thereto, energizes relay 26 thereby starting timer motor 28 at time $T_0$. The function of timer motor 28, as hereinafter described, is to perform a switching function in order to provide a proper sampling interval for area 23, which is to be examined for ferromagnetic line content. The bill 10 then continues its travel in the direction indicated, until magnetic detection head 18 reaches area 23 i.e. at time $T_1$, which marks the beginning of the sampling period, and traverses area 23 until time $T_2$, as indicated in FIG. 3, which marks the end of the sampling period. Referring to FIG. 2, the notations on the flow lines to the various block components indicate the period during the timing cycle during which the referenced block component is switched "on."

At time $T_1$, timer motor 28 is operative to render switch 30 "on," thereby applying the signal pulse produced by amplifier 20 to charging circuit 32, which is operative to store the pulses applied thereto and provide a signal at its output representing the sum of the input pulses. The pulses provided by amplifier 20 will continue to be fed to charging circuit 32 from time $T_1$ until the termination of the sampling period, indicated as time $T_2$, whereupon timer motor 28 is operative to render switch 30 "OFF" thereby interrupting the flow of input pulses thereto from amplifier 20. At time $T_2$, therefore, there is stored in charging circuit 32, a voltage which corresponds to the total number of lines in sampling area 23.

At a subsequent time $T_3$, timer motor 28 is operative to render switch 34 "on," thereby applying the signal representing the sum of the pulses stored in charging circuit 32 to comparator circuit 36. During the period from time $T_3$ to comparator circuit 36 is operative to compare the stored sum signal of charging circuit 32, with a preselected reference signal representing the ferromagnetic content of a genuine bill. Accordingly, depending on whether the stored sum signal provided by charging circuit 32 lies within the preselected limits of the reference signal, a recognition signal is provided to reject circuit 38, indicating whether the submitted bill is acceptable or not. Reject circuit 38 may suitably comprise known control relays and an indicator mechanism e.g. a pilot light, to indicate that the submitted bill does or does not meet the predetermined standards.

After the detected voltage sum signal provided by charging circuit 32 has been compared with the reference voltage provided by comparator circuit 36, and the bill authenticity accordingly determined, charging circuit 32 is discharged, to bring charging circuit 32 back to its presampling condition. The period of discharge, which is initiated and terminated by discharge switch 40 which selectively connects circuit 32 to ground terminal 42, begins at a time $T_5$ and ends at time $T_6$, which may typically take about 600 milliseconds.

Figure 6:
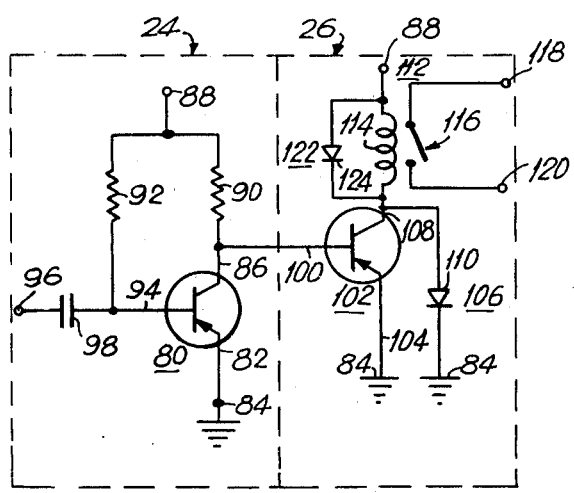
FIG. 6 is a detailed schematic circuit drawing of the Timer on Gate and Relay Driver depicted in FIG 2.
Figure 4:
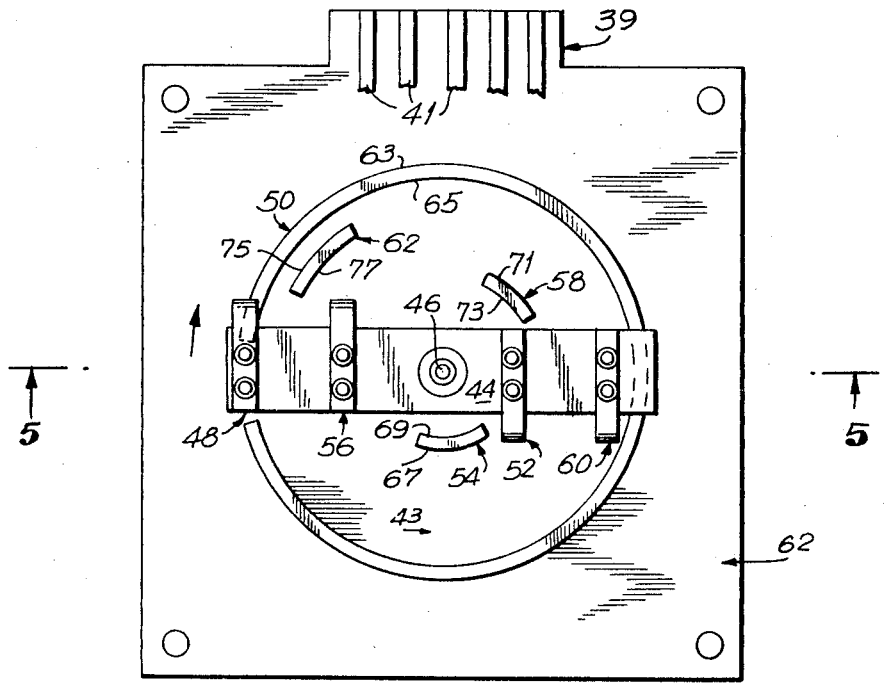
FIG. 4 shows a plan view of the timer motor of the preferred embodiment of the present invention.
Figure 5:
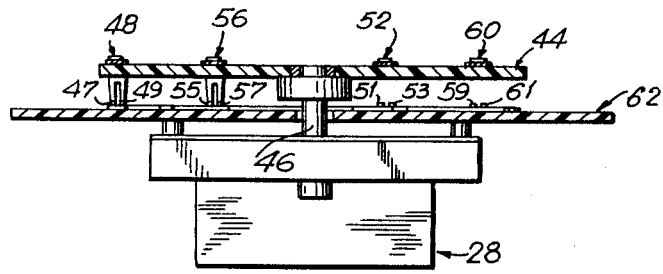
FIG. 5 is a sectional view along line 5—5 in FIG. 4.

The timed sequence of operations described above may be more clearly understood by reference to FIG. 4 which depicts timer 29 and its associated switching function. Timer 29, comprises a wiper arm 44 which is rotatably mounted on motor shaft 46, and is driven at constant speed by electric timer motor 28. Wiper arm 44 has mounted thereon, at suitably spaced intervals along its length, a series of contact pairs 48, 52, 56, and 60 respectively. Timer motor 28 is mounted on a printed circuit board 62 which comprises electrical conductors 41 embedded in an insulator disc 43 which is operative to interconnect various portions of the circuitry when printed circuit 62 is suitably inserted in a terminal plug (not shown) at its terminal end 39. Embedded in insulator 63, is a series of concentric tracks each having a pair of parallel line conductor contacts which are suitably connected to respective portions of the circuitry, as indicated schematically in the block diagram of FIG. 2. Thus contact pairs 48, 56, 52 and 60 comprise wiper contact prongs 47 and 49; 55 and 57; 51 and 53; and 59 and 61 respectively. The wiper contact prongs are operative to electrically bridge the inner and outer parallel line contacts of tracks 50, 54, 58 and 62 sequentially as wiper arm 44 is rotated in clockwise direction is shown. Thus, as wiper arm 44 is rotated, during the course of one revolution, contact prongs 47 and 49 will electrically bridge outer and inner track conductors 63 and 65 respectively, contact prongs 51 and 53 will electrically bridge outer and inner track conductors 67 and 69 respectively which correspond to switch 30; contact prongs 55 and 57 will electrically bridge outer and inner track conductors 71 and 73 which correspond to switch 34, and contact prongs 59 and 61 will electrically bridge outer and inner track conductors 75 and 77 respectively which correspond to switch 40. The times of contact of the respective tracks is indicated by the notation used in the flow lines in the block diagram of FIG. 2. Thus arm contact pair 48 will switch "on" timer motor 28 from the beginning of track 50, indicated as time $T_0$, until the end of track 50 indicated as time $T_7$. Similarly tracks 54, 58 and 62 which correspond to switches 30, 34 and 40 respectively will be switched on from time $T_1$ to $T_2$; time $T_3$ to $T_4$, and $T_5$ to $T_6$ respectively. Referring to FIG. 6 timer "ON" Gate 24 is operative to switch "ON" and "OFF," shown generally at transistor 80, having its emitter 82 connected to ground terminal 84 and its collector 86 connected to D.C. supply terminal 88 through collector resistor 90. Resistor 92 is connected between supply terminal 88 and base 94 to provide a suitable bias voltage to base 94. The input to gate 24 is applied from amplifier 20 at input terminal 96 to base 94 through coupling capacitor 98.

The output of gate 24 is produced at collector 86 which is applied to relay 26 at base 100, of transistor 102, base 100 being D.C. coupled to base 100. Emitter 102 in connected to ground terminal 84 and diode 106 is connected between collector 108 and ground 84, having its anode 110 connected to collector 108. A relay 112 is provided in the collector circuit of transistor 102 to selectively switch "ON" and "OFF" timer motor 28 in accordance with the input signal at input terminal 96 of gate 24. Relay 112 comprises a relay coil 114 connected between collector 108 and D.C. supply terminal 88 and a contact switch 116 connected to a pair of relay output terminals 118 and 120 which are connected between timer motor 28 and a source of electric power (not shown) to energize motor 28. Peaking diode 122, having its cathode 124 connected to collector 108, is connected across relay coil 114. Thus, in accordance with the input signal applied at input terminal 96 timer motor 28 is selectively energized or stopped.

Figure 7:
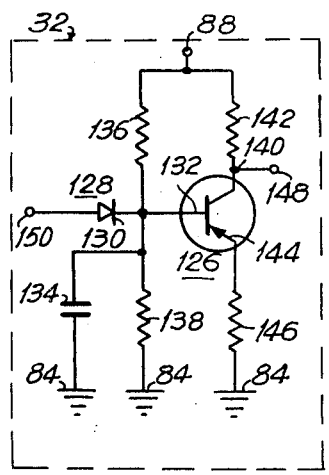
FIG. 7 is a detailed schematic circuit drawing of the Charging Circuit, depicted in FIG. 2.

Referring to FIG. 7 there is shown charging circuit 32 as including a transistor 126 and an input pulse storage arrangement comprising an input diode 128 having its cathode 130 connected to base 132, and a storage capacitor 134 connected between base 132 and ground terminal 84. Resistor 136 connected between D.C. supply terminal 88 and base 132, and resistor 138 connected between base 132 and ground terminal 84 provide a bearing voltage for base 132. Collector 140 is connected to supply terminal 88 through collector resistor 142 and emitter 144 is connected to ground terminal 84 through emitter resistor 146, with the output at collector 140 being applied to comparator 36 through switch 34 at output terminal 148.

The output from amplifier 20, which comprises a series of positive spiked pulses representing the detected magnetic lines, as explained above, is applied to input terminal 150 of charging circuit 32. As the input pulses are applied to input terminal 150 the voltage on storage capacitor will build up, thus integrating the series of incoming pulses over the period of time that magnetic head 18 is sampling the ferromagnetic line content of area 23 in bill 10, i.e. from time $T_1$ to time $T_2$. Thus, as the charge on capacitor 134 builds, the output voltage at output terminal 148 will accordingly increase until the termination of the ferromagnetic sampling period i.e. time $T_2$. Hence, at the end of the sampling period i.e. time $T_2$, there is provided a voltage signal at terminal 148 which is proportional to the ferromagnetic line content in sampled area 23 of bill 10.

Referring to FIG. 8, comparator circuit 36 is operative to determine whether the signal input thereto at input terminal 152, that is the output signal from charging circircuit 32 at terminal 148 lies within predetermined limits and to provide a threshold recognition signal accordingly. The threshold signal provided by comparator circuit 36, is fed to reject circuit 38 which may suitably comprise a conventional amplifier (not shown) for amplifying the threshold signal from comparator 36, and a relay together with an indicator mechanism, such as a pilot light (not shown) to indicate that the submitted bill does not meet the predetermined standards.

Comparator 36 comprises a pair of back-biased diodes 154 and 146, which are referenced to reference voltages provided by potentiometers 158 and 160. Resistor portions 162 and 164, of potentiometers 158 and 160 respectively, are connected between negative supply terminal 166 and ground terminal 84, so as to provide a selectively variable reference potential at wiper arms 168 and 170. Diode 154 has its anode 172 connected to wiper arm 168, and its cathode 174 connected to input terminal 152, whereas, diode 156 has its cathode 176 connected to wiper arm 170 and its anode 178 to input terminal 152. Output coupling capacitors 180 and 182 are respectively connected at one end to anode 172 and cathode 176, and to output terminal 184 at the other end, to thereby couple the output of comparator circuit 36 to reject circuit 38.

When a bill is transported past magnetic detection head 18, a potential signal will appear on terminal 148 of charging circuit 32, which represents the ferromagnetic line content of area 23 under examination. If this integrated voltage signal falls within the predetermined limits as indicated by the settings of wiper arms 168 and 170, then no current will flow through either diodes 154 or 156, comparator circuit 36 will have a zero output at lead 86, and reject circuit 38 will remain deactivated. If however, the integrated ferromagnetic content signal is less than the predetermined limit, the signal provided at input terminal 152 will cause diode 154 to conduct, thereby producing a voltage signal across coupling capacitor 180, which is applied by terminal 184 to reject circuit 38, to provide a reject signal.

If the detected ferromagnetic content signal is greater than the predetermined maximum limit, the signal provided at input terminal 152 will cause diode 58 to conduct, thereby providing a voltage signal across coupling capacitor 182 and causing reject circuit 38 to provide a reject signal.

It is understood, that the apparatus and method of the ferromagnetic content test of the present invention as described above, may be used individually to test the authenticity of currency or like, or in conjunction with other tests such as an optical, or color content test, so that paper currency may be subject to a series of tests of its various optical and magnetic properties.

What is claimed to be new and desired to be secured by U.S. Letters Patent is:

1. Apparatus for recognizing an object having a ferromagnetic inked surface and adapted to being connected to a unipotential source having supply and ground terminals, and comprising: a D.C. magnetic source for magnetizing said ferromagnetic inked surface, ferromagnetic detection means, means for sequentially transporting said object past said magnetic source and said ferromagnetic detection means, said ferromagnetic detection means being operative to detect the ferromagnetic content of said inked surface as said inked surface moves there past, and to provide a series of electrical signals, representative of said detected ferromagnetic content; amplifier means for amplifying said series of electrical signals; charging means for selectively accumulating said amplified series of electrical signals to provide a sum signal therefrom, comparator means for determining whether the magnitude of said sum signal lies within preselected limits, switching means for selectively applying said series of electrical signals to said charging means and said sum signal to said comparator means connected to said comparator means for providing a recognition signal representative of whether the magnitude of said sum signal lies within said preselected limits, said switching means including timing means for controlling the sequential application of said series of electrical signals to said charging means, the termination of the application of said series of electrical signals to said charging means, and the application of said sum signal to said comparator means; said ferromagnetic inked surface having a distinctive portion of the region first scanned by said magnetic source and ferromagnetic detection means, said ferromagnetic detection means being operative to produce a distinctive initiating signal representative of said distinctive portion of said ferromagnetic inked surface, said timing means being operative in response to said initiating signal to commence the sequential operation of said switching means.

2. Apparatus as defined in claim 1 wherein said comparator means comprises, a reference potential source having a pair of output terminals, first and second potentiometer means each having a resistor portion and a wiper arm, said first and second resistor portions being connected between said reference potential source output terminals, a first diode having its anode connected to said first wiper arm, a second diode having its cathode connected to said second wiper arm and its anode connected to the cathode of said first diode, means for applying said sum signal to the junction of said first and second diodes, a first capacitor connected to said first wiper arm, a second capacitor interconnecting said second wiper arm and said first capacitor, and means connecting the junction of said first and second capacitors to said indicator means to thereby provide a recognition signal indicating whether said sum signal lies within preselected limits.

3. Apparatus as defined in claim 1 wherein said switching means comprises, a timer motor having a rotatable shaft, a printed circuit board having said timer motor mounted thereon and having embedded therein a plurality of concentric conductor pairs arcuately located with respect to said timer motor shaft, a wiper arm fixedly secured to said motor shaft, a first pair of said conductors being connected to said transporting means, a second pair of said conductors being connected between the output of said amplifier means and the input of said charging means, a third pair of said conductors being connected between the output of said charging means and said comparator means, a fourth pair of said conductors being connected between the output of said charging means and said unipotential source ground terminal, and contact means mounted on said wiper arm for sequentially connecting each of said conductor pairs.

4. Apparatus as defined in claim 3 wherein said contact means comprises first, second, third and fourth pairs of contact prongs suitably spaced along said wiper arm whereby said contact prongs pairs sequentially connect each of said conductors in each of said first, second, third and fourth conductor pairs respectively, as said wiper arm is rotatably driven by said timer motor shaft.

5. Apparatus as defined in claim 4 wherein said charging means comprises a transistor having its collector connected to said unipotential supply terminal through first resistor and its emitter connected to said ground terminal through a second resistor, a charging capacitor connected between the base of said transistor and said ground terminal, an input diode having its anode connected to said second pair of said embedded concentric conductors, and its cathode connected to said base, third and fourth resistors for providing a bias voltage for said transistor, respectively connected between said supply terminal and said base, and between said base and said ground terminal respectively, whereby upon the connection of said pair of conductors in said second conductor pair, said amplified signals from said amplifier means are applied to said charging capacitor.

6. Apparatus as defined in claim 4 wherein said first and third pairs of contact prongs are disposed on said wiper arm on one side of said timer motor shaft, and said second and fourth pairs of said contact prongs are disposed on said wiper arm on the opposite side of said timer motor shaft, whereby upon rotation of said wiper arm said contact prongs pairs sequentially energize said transport means, connect said amplifier means to said charging means, disconnect said amplifier means from said charging means, connect said charging means to said comparator means, disconnect said charging means from said comparator means, connect said charging means to said ground terminal, disconnect said charging means from said ground terminal, and deenergize said transport means.

References Cited
UNITED STATES PATENTS

| | | |
|---|---|---|
| 3,231,861 | 1/1966 | French. |
| 3,246,297 | 4/1966 | Silverstein et al. |
| 3,292,149 | 12/1966 | Bourne _____ 340—146.3 |
| 3,305,833 | 2/1967 | Gallien _____ 340—146.3 |
| 3,256,984 | 6/1966 | Ptacek. |
| 3,356,992 | 12/1967 | Ptacek et al. |

HAROLD PITTS, Primary Examiner

U.S. Cl. X.R.

194—4; 209—111.8; 250—219; 324—34; 340—146.3; 346—74